United States Patent [19]

Horchos et al.

[11] Patent Number: 4,489,863

[45] Date of Patent: Dec. 25, 1984

[54] PRECISION FLUID DISPENSE VALVE

[75] Inventors: Leonard A. Horchos; Harold W. Lorber, both of Poughkeepsie, N.Y.

[73] Assignee: International Business Machines Corporation, Armonk, N.Y.

[21] Appl. No.: 347,843

[22] Filed: Feb. 11, 1982

[51] Int. Cl.³ .................................... F16K 31/08
[52] U.S. Cl. .............................. 222/504; 251/65; 251/139; 251/141
[58] Field of Search ............... 222/504, 189; 251/139, 251/141, 65

[56] References Cited

U.S. PATENT DOCUMENTS

| | | | |
|---|---|---|---|
| 2,526,735 | 10/1950 | Duce | 222/504 |
| 2,601,579 | 6/1952 | Wittmann | 236/88 |
| 2,609,835 | 9/1952 | Horvay | 137/528 |
| 2,609,974 | 9/1952 | Brous | 222/442 |
| 3,023,576 | 3/1962 | Musgrave | 251/139 |
| 3,053,413 | 9/1962 | Feuer | 222/5 |
| 3,204,832 | 9/1965 | Barber | 222/196 |
| 3,211,173 | 10/1965 | Mueller et al. | 137/454.5 |
| 3,245,652 | 4/1966 | Roth | 251/141 |
| 3,323,560 | 6/1967 | Ehlers | 141/208 |
| 3,355,145 | 11/1967 | Castalet | 251/141 |
| 3,628,767 | 12/1971 | Lombard | 251/141 |
| 3,714,823 | 2/1973 | Wilkens et al. | 251/65 |
| 3,731,670 | 5/1973 | Loe | 128/1 R |
| 3,795,383 | 3/1974 | Lombard et al. | 251/139 |
| 3,881,637 | 5/1975 | Browne | 222/189 X |
| 4,121,741 | 10/1978 | Adamson | 251/65 |
| 4,320,781 | 3/1982 | Bouvet et al. | 251/141 |
| 4,392,632 | 7/1983 | Gast et al. | 251/65 |

FOREIGN PATENT DOCUMENTS

| | | |
|---|---|---|
| 914086 | 6/1954 | Fed. Rep. of Germany . |
| 1775726 | 9/1971 | Fed. Rep. of Germany . |
| 3028938 | 2/1981 | Fed. Rep. of Germany . |
| 1179719 | 1/1970 | United Kingdom . |
| 1442984 | 7/1976 | United Kingdom . |

OTHER PUBLICATIONS

The Review of Scientific Instruments, "An Inexpensive Electronically Controlled Constant Rate Addition Funnel, P. S. Engel, Nov. 1972, pp. 1707-1709.

Primary Examiner—Stanley H. Tollberg
Assistant Examiner—Kevin P. Shaver
Attorney, Agent, or Firm—Douglas A. Lashmit; Mitchell S. Bigel; John A. Jordan

[57] ABSTRACT

A micro dispense valve arrangement for accurately dispensing minute quantities of a fluid. The valve arrangement interfaces an enclosed interior region under pressure with an exterior region of less pressure through an orifice opening. The orifice wall is tapered from interior to exterior to bound a frustoconical region constricting toward the exterior to accommodate a magnetizable pellet or ball. The ball is held in its seated position against the orifice wall by permanent magnets imbedded in the wall. An AC coil surrounding the orifice opening acts when energized to cause the ball to move between its seated or closed position and a non-magnetizable screen in its open position. The frequency and duration of applied positive and negative pulses driving the coil act to control the on/off fluid flow duty cycle of the valve.

9 Claims, 3 Drawing Figures

PRECISION FLUID DISPENSE VALVE

BACKGROUND OF THE INVENTION

1. Field of the Invention

The present invention relates to dispense valves and, more particularly, to precision dispense valves for controllably dispensing minute increments of a fluid in metered amounts at selectable rates.

2. Description of the Problem and Prior Art

Valves for dispensing selected quantities of fluid, either liquid or gas, are used in a great variety of applications. For example, a large variety of valves are used in the medical field. In addition, valves of various types are used in the field of nutrition, automatic food and beverage dispensing and processing, analysis machines such as wet chemistry analysis machines and water quality analysis machines, titration equipment, manufacturing in general, gas metering, fuel oil metering, and so on. Dispensing valves are also used as atomizing valves.

One common requirement of most of the valves used today is that they operate automatically in response to a stimulus, such as an electrical signal. Many of the valves presently available are quite adequate for their intended application. However, where a high degree of accuracy is required to dispense a precise volume of material automatically, available valves fall short. More particularly, where applications require a precise volume to be dispensed over a given period of time under, for example, computer control, existing valves are deficient. Such applications not only require the mechanical valve arrangement to operate accurately and reliably; they also require the valve control function to accurately respond to variations in electrical signal with the precision of the dispensing operation being at least a partial function of how closely the signals represent the true requirements of the system. It has been found that valves which operate in an on/off or binary mode to dispense fluid, as opposed to varying the orifice size, are more advantageous in metering applications.

Typical of prior art dispensing valves is that described by Lombard et al in U.S. Pat. No. 3,795,383. Lombard et al show a ball-type solenoid valve for dispensing fluid. Although the Lombard et al valve is a binary-type valve, i.e. on/off-type, it lacks process control capability such as to function to meter fluid in accordance with the frequency or repetition rate of the applied control signal. Accordingly, the Lombard et al valve is not capable of the accuracy and precision required by many applications and this is due in part, at least to the fact that the valve ball is held in place against the fluid pressure by an electromagnet and fluid is dispensed in response to de-energizing the magnet.

Another prior art ball-type valve arrangement is that described by Loe in U.S. Pat. No. 3,731,670. The Loe valve is designed as a binary or on/off valve for use within a duct of an animal body and, as such, employs an extracorporeal means to operate the valve. Loe uses an external magnet to manually move the magnetically sensitive ball from its closed seat position to an open position.

U.S. Pat. No. 3,355,145 to de Castelet also discloses a ball-type valve arrangement held in its closed position by an electromagnet, akin to the Lombard et al valve described above. Like Lombard et al, de Castelet operates in an on/off mode such that when the electromagnet is energized the ball is held in its seat to block fluid flow and when the electromagnet is de-energized, fluid forces the ball away from its seat to permit fluid to be dispensed.

Another valve arrangement typifying the prior art is the arrangement described by Brous in U.S. Pat. No. 2,609,974. Brous describes a volumetric dispensing valve for vending machines and the like using a solenoid driven magnetized pellet operative to empty fluid contained in the valve body. The Brous valve lacks close precision and accuracy and this is due, in part at least, to the fact that it cannot respond to control signals that take into account fluid temperature, viscosity and flow characteristics.

SUMMARY OF THE INVENTION

It is, therefore, an object of the present invention to provide an improved fluid dispenser.

It is a further object of the present invention to provide a fluid dispenser which accurately dispenses in increments precise quantities of fluid.

It is yet a further object of the present invention to provide a process control valve which has a proportional throughput capability.

It is yet still a further object of the present invention to provide a precision dispensing valve which has a controllable on/off duty cycle exhibiting computer interface compatibility whereby during valve operation parameters such as temperature, viscosity and fluid flow characteristics may be taken into consideration.

It is another object of the present invention to provide a binary volumetric dispense valve which responds to the frequency and duration of the applied control signals to accurately meter fluid or gas in a simple and reliable manner.

In accordance with the present invention, a dispense valve arrangement and control process is provided to dispense minute quantities of a fluid or gas. This is achieved by providing a valve arrangement including a container that houses, under pressure, the fluid or gas to be dispensed. The fluid container is arranged to include an orifice which acts to open the container interior region to the exterior. The orifice walls are tapered from the container interior region to exterior to accommodate a ball which acts to prevent fluid from exiting when the ball is seated in place against the orifice walls. The ball, made of a magnetizable material, is held in place by permanent magnets imbedded in the tapered walls. An AC coil acts, when energized, to cause the ball to oscillate between its seated (closed) position and a nonmagnetizable screen (open position) situated on the interior surface of the container at the wide end of the tapered orifice. The frequency and duration of the positive and negative pulses driving the coil act to control the on/off fluid flow cycle.

The foregoing and other objects, features and advantages of the invention will be apparent from the following more particular description of the preferred embodiments of the invention, as illustrated in the accompanying drawings.

DETAILED DESCRIPTION OF THE DRAWINGS

Figure 1:
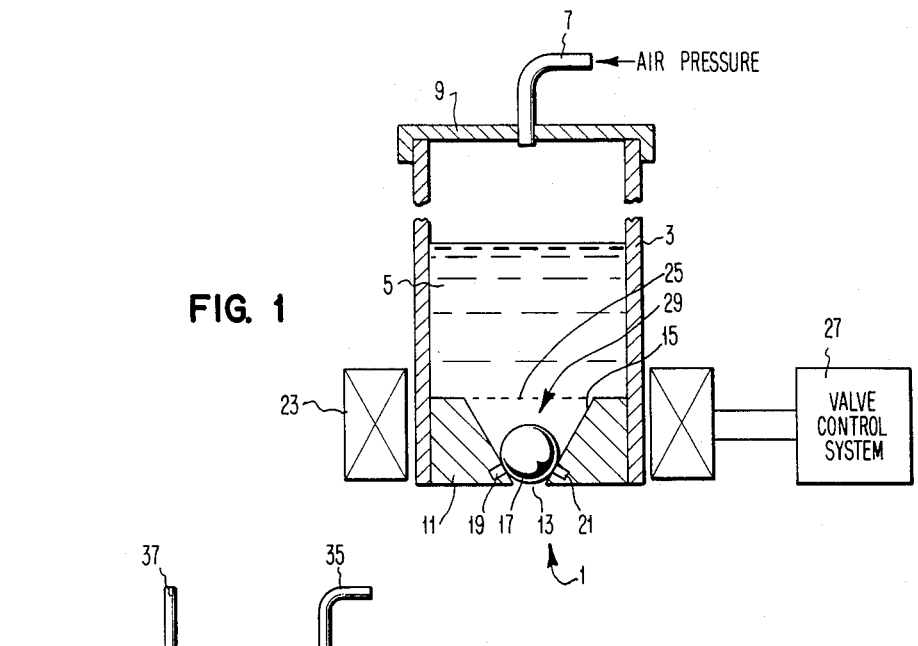
FIG. 1 shows the precision fluid dispense valve, in accordance with the present invention, wherein liquid, under pressure, may be dispensed in response to a control signal.

With reference to FIG. 1, there is shown one embodiment of the precision fluid dispense valve, in accordance with the principles of the present invention. In this embodiment, fluid in the form of a liquid may be dispensed into atmosphere. In this regard, it is clear that with the liquid under pressure, it may be dispensed into any environment which is at a lower pressure than the fluid pressure. The fluid under pressure may be any of a variety of fluids, depending upon the particular application.

As may be seen with regard to FIG. 1, fluid dispense valve 1 is fitted into container 3 in a manner to permit liquid 5 to be in contact therewith. Liquid 5 is maintained under constant air pressure via port 7. As may be seen, container 3 may be a cylinder sealed by cap 9 at one end and dispense valve 1 at the other.

Precision dispense valve 1 comprises orifice unit or wall segment 11 made up in this instance of a relatively thick disc-shaped member. Typically, orifice unit 11 is made of non-magnetic metal and is inserted within container 3 in a manner to seal the interior region thereof from the exterior environment. It should be appreciated that the shape of container 3 and attached pressure cap 9 and orifice unit 11 is a matter of design choice with the particular shape thereof having little bearing on the operation of the micro fluid dispense valve, in accordance with the principles of the present invention.

Figure 2:
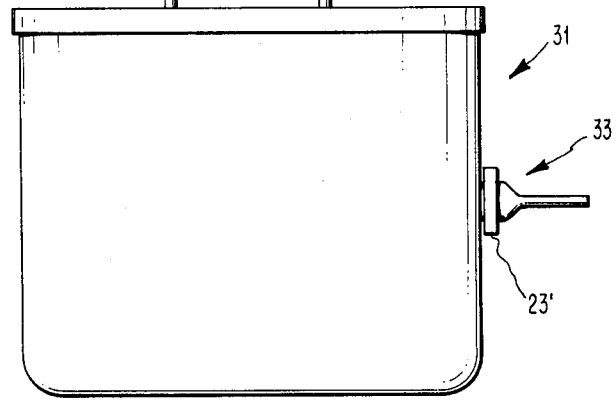
FIG. 2 shows the fluid dispense valve, in accordance with the present invention, wherein the valve is employed to meter gas into an evacuated chamber.
Figure 3:
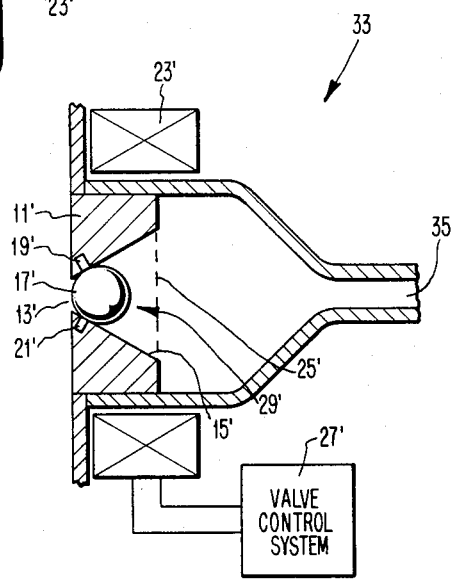
FIG. 3 shows an enlarged view of the fluid dispense valve arrangement used in FIG. 2.

As may further be seen with reference to FIG. 1, orifice unit 11 contains an orifice opening 13 to the exterior from within container 3 with the orifice wall 15 being tapered toward the opening from interior to exterior to constrict orifice region 29, as shown. As may be seen, the tapered wall acts to bound region 29 in the form of a frustoconical section to accommodate ball or spherical pellet 17 which seats in the orifice on its wall in a manner to seal the interior region of container 3 from the exterior. It should be appreciated that the drawings in FIGS. 1, 2 and 3 are schematic and for purposes of description and are not intended to depict actual or relative sizes or scale. Thus, the general size of the orifice with respect to ball 17 may vary, as may the taper of wall 15, the thickness of the disc and the size of orifice opening 13 and container 3. In this regard, it can be seen in FIG. 1 that the walls of container 3 are shown broken to indicate that the container length may vary. However, it is clear that the width may likewise vary.

Ball 17 is made of a magnetizable material and is held in place by permanent magnets 19 and 21. As can be seen, permanent magnets 19 and 21 are imbedded within the orifice unit 11 at a location such as to effectively accommodate and seat ball 17 in place. In this regard, ball 17 is further held in place by the pressurized liquid within container 3. Ball 17 may be coated with an insulation material which will not affect the magnetizable material and yet will protect the ball and act to aid in sealing orifice opening 13. Accordingly, an insulation material with some degree of resiliency and yet toughness should be selected. For example, ball 3 may be coated with a layer of polytetrafluoroethylene or similar material.

Again, with reference to FIG. 1, AC coil 23 is positioned to surround container 3 adjacent orifice unit 11. When the AC coil is energized, it causes ball 17 to oscillate between orifice opening 13 and non-magnetizable screen 25. As can be seen, screen 25 is positioned along the interior surface of the orifice unit in a manner to allow liquid to pass therethrough and yet retain ball 17 within the orifice region when an AC signal energizes coil 23. Signals are applied to the AC coil via valve control system 27. In this regard, valve control system 27 may comprise any of a variety of electronic control apparatus which acts to provide an alternating driving signal to the coil. In its simplest form, control system 27 may comprise an alternating pulse generator producing pulses, the amplitude, frequency and duration of which determine the on/off fluid flow duty cycle. Thus, where a positive pulse acts to cause ball 17 to move away from magnets 19 and 21 to open orifice opening 13, the duration of such pulse would determine the period during which said orifice is open, i.e. the "on" time during which fluid is dispensed. On the other hand, the repetition rate of such positive pulses would determine the frequency with which said valve is "on" or open, i.e. the frequency with which slugs or bursts of fluid are emitted or dispensed from the valve. It should be appreciated, that coil 23 may be wound so that either positive or negative pulses act to break ball 17 loose from the force of permanent magnets 19 and 21 in oscillatory fashion. It is evident that the magnitude of the force created by coil 23, and thus the magnitude of the pulses applied thereto, must be sufficient not only to overcome the force of the permanent magnets on the ball but also the force of the fluid against the ball.

Thus, it can be seen that ball 17 normally closes orifice opening 13 and is held in place by imbedded magnets 19 and 21. On energizing AC coil 23, the ball is pulled from the magnetic force of magnets 19 and 21 (and fluid force) upwardly to permit fluid to pass around the ball and be forced by pressure through opening 13. Screen 25 inhibits the ball from moving out of the orifice region and a reverse plurality pulse on the AC coil causes the ball to be driven from the screen back to the bottom of the orifice to seat on wall 15 and block orifice opening 13 whereby liquid dispensing is inhibited.

The frequency response of ball 17 is high thus allowing high frequency on/off valve operation which is both precise and repeatable. It should be appreciated that the duration of each positive and negative pulse permits a second dimension of flow control in addition to that offered by variation in frequency.

It is apparent to those skilled in the art, that valve control system 27 may comprise a computer or microprocessor arrangement which acts to generate pulses in accordance with the temperature, viscosity and flow characteristics of the liquid being dispensed. In addition, such computer or microprocessor arrangement may likewise be employed to consider other parameters, in accordance with the particular application and optimum operating conditions.

FIG. 2 shows an embodiment where the fluid dispense valve, in accordance with the present invention is employed to admit gas into an evacuated chamber. The dispense valve shown at 33 is shown in enlarged view in FIG. 3. In FIG. 2, the evacuated chamber may be the vacuum chamber employed in any of a variety of applications. For example, reactive ion etching systems require an evacuated chamber. In addition, ion etching-/milling systems, evaporator sputter-cleaning systems and chemical vapor deposition systems all require an evacuated chamber. Such applications may require minute and controlled amounts of argon, for example, to be admitted into the chamber in a controlled manner. Other applications require the vacuum level within the chamber to be maintained at a predetermined magnitude. Levels of vacuum may be maintained within the chamber by allowing the vacuum pumps to operate at their relatively constant pumping rate and the micro dispense valve, in accordance with the present invention, operate to bleed in air or other gas in a pressure vernier manner to maintain the required vacuum level.

As shown in FIG. 2, vacuum chamber 31 is arranged to accommodate fluid dispense valve 33 in a manner to seal the chamber interior from the gas under pressure admitted at 35. Chamber 31 may be evacuated via port 35 and gas may be admitted in conventional manner via port 37. The fluid dispense valve employed in FIG. 2, and as more particularly shown in FIG. 3, is the same as that shown in FIG. 1 with like reference characters employed to identify like elements. The operation of the fluid dispense valve in FIGS. 2 and 3 is the same as that in FIG. 1, the difference residing in the fact that the fluid employed is gas (admitted at 35) with the gas being metered into the evacuated chamber, i.e. a chamber at a lower pressure level than the gas pressure level. Where, for example, the dispense valve is employed as a pressure vernier to control the vacuum level within the chamber, it is clear that a pressure sensing device within the chamber may be employed with valve control system 27' in a feedback arrangement to maintain the required vacuum level. Valve control system 27 may be a micro processor or any of a variety of electronic control devices for providing alternating pulses to coil 23'.

It is evident from the above description that the micro fluid dispense valve in accordance with the principles of the present invention may be used in any of a variety of applications where precise and repeatable metering of fluid is required. It is also evident that the size of the valve and orifice opening 13 determines the volume of fluid dispensed within a given time period and pressure level. Where orifice opening 13 is made quite small and the pressure is large, the dispense valve may be employed as an atomizer, as is understood by those skilled in the art.

While the invention has been particularly shown and described with reference to the preferred embodiments thereof, it will be understood by those skilled in the art that various changes in form and details may be made therein without departing from the spirit and scope of the invention.

What is claimed is:

1. A dispense valve arrangement for accurately metering fluid under pressure in quantities dependent upon the frequency and duration of electrical pulses, comprising:
    a non-magnetic wall segment having an annular frustoconical orifice with a tapered wall that constricts in a direction away from said fluid;
    a sphere of magnetizable material coated with non-magnetic material, positioned within said orifice for closing said orifice and preventing escape of said fluid under pressure;
    a permanent magnet embedded within said non-magnetic wall segment at or near the surface of said tapered wall, positioned to seat said sphere against said tapered wall to close said orifice;
    an AC coil, concentrically wound to surround said non-magnetic wall segment, responsive to electrical pulses to create a magnetic field within said frustoconical orifice without the use of magnetic pole pieces within said frustoconical orifice, said magnetic field overriding said permanent magnet and causing said sphere to unseat and open said orifice; and,
    a screen of non-magnetic material for retaining said sphere within said orifice when said AC coil is energized by said electrical pulses to unseat said sphere.

2. The dispense valve as set forth in claim 1 wherein said fluid is liquid.

3. The dispense valve as set forth in claim 1 wherein said fluid is gas.

4. The dispense valve as set forth in claim 1 wherein the repetition rate of said electrical pulses determines the rate at which said sphere of magnetizable material oscillates between its closed and open position and the duration of said pulses determines the respective time periods during which said orifice is open and closed.

5. A dispense valve arrangement for accurately metering quantities of fluid between an interior region under pressure and an exterior region of less pressure, said valve comprising:
    a non-magnetic wall section for interfacing said interior region to said exterior region, said wall section having an annular frustoconical orifice with its wall tapered between said interior and exterior region so as to constrict in the direction toward said exterior region;
    a sphere of magnetizable material coated with non-magnetic material positioned within said orifice for closing said orifice and preventing fluid passage between said interior region and exterior region;
    permanent magnet means embedded within said non-magnetic wall segment at or near the surface of said tapered wall, positioned to attract and seat said sphere against said orifice wall to close said orifice;
    AC coil means surrounding said orifice and responsive to AC signals to create a magnetic force within said frustoconical orifice without the use of magnetic pole pieces within said orifice to override the force exerted on said sphere by said permanent magnet means and fluid and thereby cause said sphere to unseat and open said orifice; and
    a screen of non-magnetic material for inhibiting said sphere from moving out of said orifice when said AC signals are applied.

6. The dispense valve as set forth in claim 5 wherein said AC signals comprise alternating pulses.

7. The dispense valve as set forth in claim 6 wherein the repetition rate of said pulses determines the rate at which said magnetizable sphere oscillates between its closed position and open position and the duration of said pulses determines the respective time periods during which said orifice is in its closed position and open position.

8. The dispense valve as set forth in claim 7 wherein said fluid is liquid.

9. The dispense valve as set forth in claim 7 wherein said fluid is gas.

* * * * *